United States Patent
Schroedel et al.

(10) Patent No.: US 10,186,991 B2
(45) Date of Patent: Jan. 22, 2019

(54) HYBRID CONNECTOR FOR A DRIVE SYSTEM, HYBRID BRIDGE AND ELECTROMOTIVE DRIVE SYSTEM

(71) Applicant: BAUMUELLER NUERNBERG GMBH, Nuremberg (DE)

(72) Inventors: Georg Schroedel, Nuremberg (DE); Bernd Bormuth, Nuremberg (DE)

(73) Assignee: Baumueller Nuernberg GmbH, Nuremberg (DE)

( * ) Notice: Subject to any disclaimer, the term of this patent is extended or adjusted under 35 U.S.C. 154(b) by 8 days.

(21) Appl. No.: 15/356,889

(22) Filed: Nov. 21, 2016

(65) Prior Publication Data
US 2017/0149363 A1 May 25, 2017

(30) Foreign Application Priority Data
Nov. 20, 2015 (DE) ........................ 10 2015 222 982

(51) Int. Cl.
| | |
|---|---|
| H02P 5/74 | (2006.01) |
| H02K 5/14 | (2006.01) |
| H02K 11/33 | (2016.01) |
| H01R 13/05 | (2006.01) |
| H01R 13/11 | (2006.01) |
| H01R 24/20 | (2011.01) |
| H01R 27/02 | (2006.01) |
| H02K 5/22 | (2006.01) |
| H01R 107/00 | (2006.01) |

(52) U.S. Cl.
CPC .............. *H02P 5/74* (2013.01); *H01R 13/05* (2013.01); *H01R 13/11* (2013.01); *H01R 24/20* (2013.01); *H01R 27/02* (2013.01); *H02K 5/225* (2013.01); *H02K 11/33* (2016.01); *H01R 2107/00* (2013.01); *H01R 2201/26* (2013.01); *H02K 5/143* (2013.01)

(58) Field of Classification Search
CPC ......... H02J 50/12; E06B 9/72; H01L 2924/00
See application file for complete search history.

(56) References Cited

U.S. PATENT DOCUMENTS

| | | | |
|---|---|---|---|
| 2008/0018184 A1* | 1/2008 | Seufert | H02K 5/143 310/68 B |
| 2014/0156091 A1 | 6/2014 | Ying | |
| 2015/0002002 A1* | 1/2015 | Monster | F04D 13/0686 310/68 R |
| 2015/0076942 A1* | 3/2015 | Madsen Obel | H02K 5/18 310/59 |

FOREIGN PATENT DOCUMENTS

| | | |
|---|---|---|
| DE | 102009031466 A1 | 1/2011 |
| DE | 102011118359 A1 | 5/2013 |

(Continued)

*Primary Examiner* — Bentsu Ro
*Assistant Examiner* — Zemenay Truneh
(74) *Attorney, Agent, or Firm* — Laurence A. Greenberg; Werner H. Stemer; Ralph E. Locher (57) ABSTRACT

A drive system with a plurality of electromotive drives, specifically servo drives, the electronics of which are interconnected or connectable by way of a hybrid bridge. The hybrid bridge has a hybrid cable and a plug-in connector on the cable termination side for power conduction and data transmission. There is provided a drive of this type and a hybrid bridge of this type.

15 Claims, 11 Drawing Sheets

(56) References Cited

FOREIGN PATENT DOCUMENTS

| | | | |
|---|---|---|---|
| DE | 102011118360 A1 | 5/2013 | |
| DE | 202013105359 U1 * | 5/2014 | ............... H02K 5/00 |
| DE | 202013105359 U1 | 5/2014 | |
| EP | 2587642 A2 | 5/2013 | |
| WO | 20110000456 A2 | 1/2011 | |

* cited by examiner

HYBRID CONNECTOR FOR A DRIVE SYSTEM, HYBRID BRIDGE AND ELECTROMOTIVE DRIVE SYSTEM

CROSS-REFERENCE TO RELATED APPLICATION

This application claims the priority, under 35 U.S.C. § 119, of German patent application DE 10 2015 222 982.3, filed Nov. 20, 2015; the prior application is herewith incorporated by reference in its entirety.

BACKGROUND OF THE INVENTION

Field of the Invention

The invention relates to a drive system with a plurality of electromotive drives, specifically servo drives, and with at least one hybrid cable for the connection of adjoining drives for the purposes of power and data transmission. The invention also relates to a drive of this type and a hybrid cable bridge (hybrid connector system, hybrid connector) with a hybrid cable and one or respectively one cable end-mounted plug-in connector.

A control system with a control unit for servo drives is described in German utility model (Gebrauchsmuster) DE 20 2013 105 359 U1. There, at least two drives are connected in series by a hybrid cable, in order to provide electric power for the drives and a data link between the control unit and the drives.

SUMMARY OF THE INVENTION

In the drive system according to the invention, in which a plurality of electromotive drives (servo drives), i.e. specifically the power and control electronics or converters thereof, are mutually connected or connectable by way of hybrid cables for power and data transmission, the respective drive has a motor housing for the accommodation of the electric motor, i.e. the motor components thereof (stator, rotor and, where applicable, sensor/measuring device (resolver) for the detection of angular position and speed), and a converter or electronics housing, preferably configured as a half-shell housing, for the accommodation of a printed circuit board for power electronics and/or control or closed loop control electronic components.

The converter and/or electronics housing of the drive, preferably configured as a half-shell housing or half-shell-type housing, projects above the motor housing on the end face thereof, specifically on the reverse side, in the form of a housing section. A printed circuit board section of the printed circuit board is arranged in the latter. A mating connector housing (connector housing) for a mating connector set with power terminals and data and/or signal terminals arranged for bonding on the printed circuit board side, is fitted to or upon this printed circuit board section for the drive or converter electronics. Conductor rails are preferably provided for power conduction, which are integrated in the mating connector housing of the mating connector set, and which establish a through-connection of the two mating connectors in the mating connector set. For plug-in connection and plug-in contacting, the mating connectors are provided and configured with an associated hybrid connector system (hybrid connector or hybrid cable bridge), i.e. with the respective plug-in connectors thereof, which is fitted to the end of a hybrid cable comprised of power and data or signal conductors.

The respective conductor rail has a rail section which effectively acts as a through-connection, and respective terminal contacts associated with the mating connectors, preferably in the form of plug-in terminals (tabs), and a terminal contact on the printed circuit board side. Through-connection is thus advantageously effected, not on the printed circuit board side, i.e. on the electronic printed circuit board, but within the mating connector set or within the connector housing thereof. The respective conductor rail is, or functions virtually in the manner of a T-piece, the vertical end of which serves as a printed circuit board contact, whereas the horizontal ends form the plug-in terminal contacts (plug-in terminals).

As a result of the integration of the, or of each, conductor rail in the preferably common mating connector housing of the mating connector set, which is appropriately configured as an injection-molded component of plastic, in which the conductor rails or the corresponding conductor rail section are appropriately embedded, the plug-in terminals which bond with the corresponding terminals of the hybrid connector assigned for the formation of the plug-in connection on the side of the housing which faces away from the printed circuit board, i.e. facing away from the electronics or converter (half-shell) housing (thus forming the corresponding mating face for the hybrid connector) project out of the plastic molding of the mating connector housing. This mating connector housing, which is common to the mating connector set, is arranged and mounted on the printed circuit board section for drive electronics (the converter, with the power and control electronics), and the connector-side power and data terminals are (electrically) bonded therein.

The motor housing of the respective drive projects over the output side or reverse side of the electric motor (in the manner of a flat roof) such that, on the end face thereof, i.e. on the corresponding narrow side of the motor or motor housing, a terminal section of the motor housing is formed. This terminal section of the motor housing overlaps the corresponding housing section, with the printed circuit board section of the converter or electronics housing which extends therein, and is bonded with the latter, preferably to form a leak-tight housing (with the interposition of a sealing element), for example by screwing. The converter or electronics housing extends on the corresponding motor side of the drive (drive side), appropriately along the full length of the motor housing.

The terminal section of the motor housing which overlaps the housing section of the converter or electronics housing, on the terminal and/or connector side, is provided with a contact surface in a roof-shaped configuration. In other words, two contact surface regions at an obtuse angle (angle of inclination) are configured with mutually disinclined surface normals such that an acute angle (interspace angle) is formed between the hybrid cable-side connectors (plug-in connectors of the hybrid bridge) at the plug-in connection with the mating connectors of this drive, wherein the two hybrid cable-side plug-in connectors are mutually tilted or inclined (arranged or positioned) in a V-shape.

The aforementioned and described motor-side terminal section of the motor housing of the respective drive, on the terminal and connector side, in the region of the contact surface of the mating connector housing (or of the mating connector set) with a roof-shaped configuration, is penetrated such that the mating connectors, which are mutually inclined in a roof-shaped arrangement, are accessible via this motor-side terminal section for plug-in connection with individual or paired pluggable hybrid connectors (hybrid cable-side plug-in connectors).

The hybrid bridge or hybrid connector system described hereinafter, also designated simply as a hybrid connector, comprises a hybrid cable and, on at least one cable termination and preferably on both cable terminations, a plug-in connector with terminal contacts for power and data transmission, which are arranged in a connector housing. The hybrid bridge is specifically appropriate for a drive system, or for incorporation within a drive system having a plurality of electromotive drives, specifically servo drives.

The hybrid cable is advantageously configured as a flat cable. The hybrid cable is advantageously configured in an arc shape, specifically with mutually V-shaped or wedge-shaped haunches, and/or can be formed into this arc shape. Advantageously, this flat cable configuration permits an exceptionally close mutual or adjoining arrangement of the drives, specifically in the arrangement thereof along the circumference of a circle or an arc of a circle, even of comparatively small radii.

Specifically, in such an arrangement of drives on a circle or an arc of a circle, in combination with the roof-shaped contact surfaces of the preferably paired mating connectors in or upon the drive-side motor housing section, the flat cable configuration of the hybrid connector (hybrid bridge) is particularly advantageous, as the contact surfaces arranged at an angle of inclination, in their totality, permit a particularly advantageous adaptation to the plurality of circularly-positioned drives in the circular arrangements. In other words, the drives arranged along the arc of a circle, but also in a straight-line arrangement, as a result of the exceptionally space-saving design of the hybrid connector system and, where applicable, the inclined contact surfaces of the drive-side mating connectors, can be positioned exceptionally close to each other, and thus arranged with a particularly small mutual clearance.

Moreover, the connector housing of the, or of each, plug-in connector in the hybrid connector, additionally or alternatively to the preferably one-piece plastic housing, can be configured with a plurality of housing chambers for the accommodation of the, or of each, terminal contact for power and/or data transmission. Moreover, additionally or alternatively, the connector housing can be of an essentially rectangular configuration, and is specifically configured with an essentially rectangular housing cross-section.

Moreover, additionally or alternatively, the hybrid cable can be provided with a molding on its cable termination side, specifically configured as a plastic molding, for the purposes of sealing and/or strain relief, which advantageously extends into the connector housing and/or at least partially encloses and/or overreaches the latter.

Specifically in a drive system in which the mating connector set and/or the mating connectors thereof for plug-in connection are provided and configured with hybrid cable-side hybrid plug-in connectors, the contact surface of one of the mating connectors, in relation to that of the other mating connector, is inclined at an obtuse angle, thereby forming a roof-shaped overall contact surface (in the manner of a gable roof). This roof-shaped overall contact surface is arranged on the drive side, and thus on a motor housing section, in which a printed circuit board section or electronic component region (drive or converter electronics) of the electromotive drive is accommodated, with which the printed circuit board section of the mating connector set is bonded in a through-connection arrangement, specifically for the conduction of power.

Other features which are considered as characteristic for the invention are set forth in the appended claims.

Although the invention is illustrated and described herein as embodied in hybrid connector for a drive system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Referring now to the figures of the drawing in detail and first, particularly, to FIG. 1 thereof, there is shown an individual drive 1 which, within a drive system comprised of a plurality of such drives 1, by means of a hybrid connector or hybrid cable bridge designated hereinafter as a hybrid bridge 2, is appropriately coupled in a power-conducting, specifically a DC power-conducting arrangement, and in a data- or signal-transmission arrangement, with an adjoining drive 1 and/or with an (up-circuit) power supply and/or control unit (distributor). The power supply to the or to each drive 1 is appropriately delivered by an intermediate DC circuit (intermediate circuit) which, for example, supplies a 24V DC voltage and a corresponding direct current for a drive-side power section (power electronics).

The or each drive 1 is an electromotive drive with a preferably brushless electric motor, the stator-side, specifically three-phase winding of which is appropriately supplied with power (energized) by the power section (for example, by means of semiconductor switches (IGBTs) in a bridge circuit). In this form of embodiment, the rotor, which is fitted to a motor shaft in a fixed arrangement, is appropriately fitted with permanent magnets.

In a specifically appropriate embodiment of the drive 1 as a servo drive, the latter, in addition to the (brushless) electric motor and a converter (servo converter) incorporating the power section (power electronics), is provided with control electronics, which appropriately assume regulation, target value generation and monitoring functions. The power section or power electronics, and the control electronics, are also described hereinafter as the drive electronics, or simply as the electronics. These electronics specifically incorporate an electronic position, speed and/or torque regulation function, to which end the electric motor of the drive 1 is preferably equipped with a resolver, or such a resolver is assigned to the electric motor.

The drive 1 comprises a drive housing 3, which is preferably and particularly advantageously comprised and formed only of a motor housing 3a and an electronics housing 3b of preferably half-shell design. The components of the electric motor, where applicable including the resolver, and preferably including the shaft bearings, are integrated or arranged in the motor housing 3a. The drive housing 3 is provided with a projecting or recessed housing segment or region 5, specifically in a stepped or platform-type arrangement, which extends over an end face of the motor (end face) B, preferably a reverse-side end bracket, bearing cover or motor cover, or bearing flange or motor flange 4 of the electric motor. To this end, the motor housing 3a is provided with a terminal section 5a, and appropriately extends over a (base-mounted) drive system long side 6 of the drive 1. This drive system long side 6 corresponds to a housing long side 7 of the electronics housing 3b. In the installed state, the electronics housing 3b thus encloses the drive system long side 6 of the motor housing 3a, including the terminal section 5a thereof.

Figure 3:
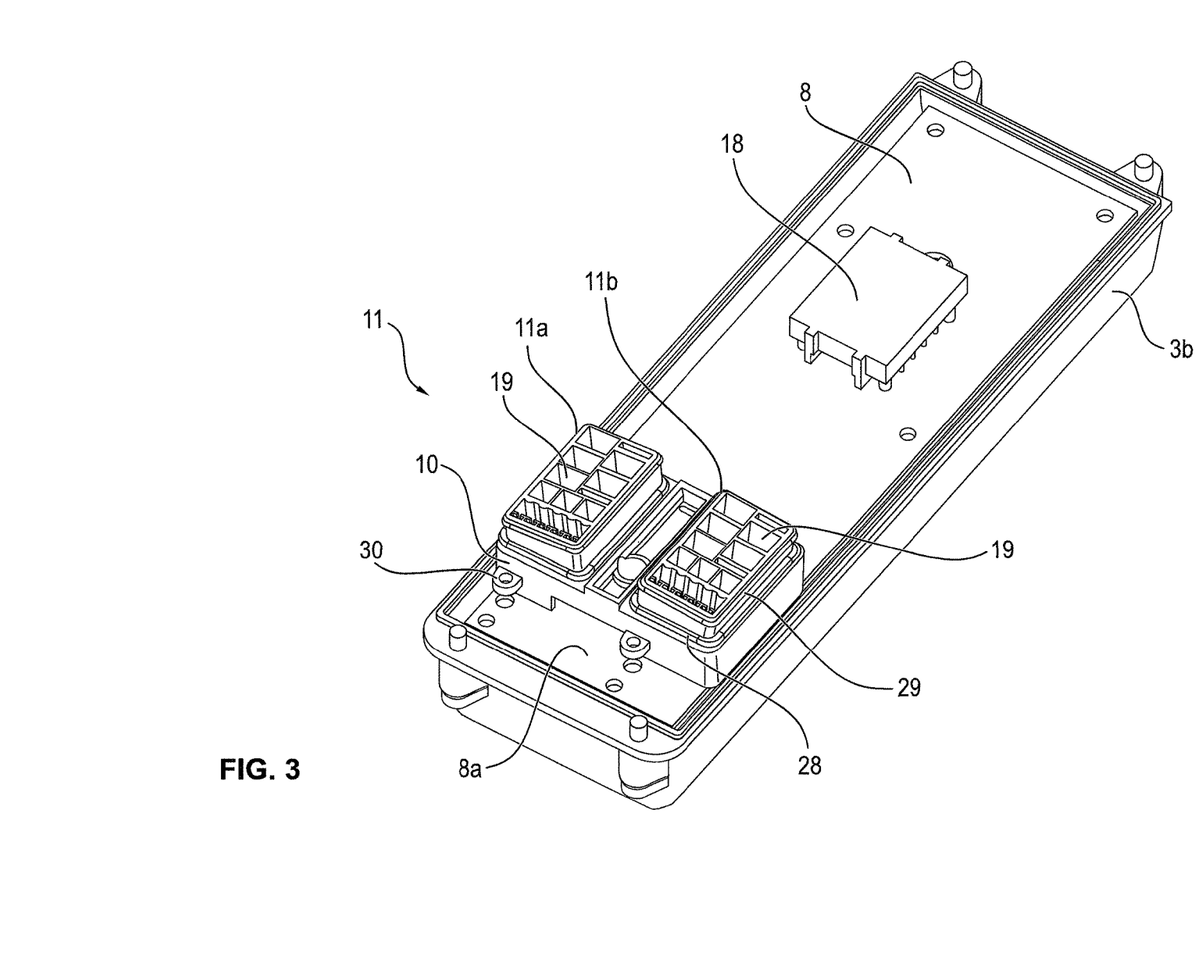
FIG. 3 is a perspective view onto the bottom half of the drive housing, forming an electronics housing part.

As can be seen with reference to FIG. 3, an electronic printed circuit board 8 is arranged or accommodated within the electronics housing 3b, wherein said printed circuit board 8 has a printed circuit board section 8a. By means of this printed circuit board section 8a, the printed circuit board 8 extends into the drive housing segment 5. The latter is formed of the terminal section or terminal region 5a of the motor housing 3a and a corresponding housing section 5b of the electronics housing 3b.

As can again be seen from FIG. 3, the printed circuit board section 8a of the electronic printed circuit board 8 is arranged and configured for the fitting of a mating connector housing 10 of a mating connector set 11 with two mating connectors 11a and 11b, and for the bonding of the plug-in and/or terminal elements thereof. These mating connectors 11a, 11b correspond to the plug-in connectors 12 of a respective hybrid bridge 2 or to a preferably equivalent plug-in connector 12 of a hybrid cable for connection to the up-circuit control unit, which is not represented in FIG. 1. In FIG. 1, the plug-in connector 12 assigned to the up-circuit control unit is represented with no hybrid cable.

Figure 2:
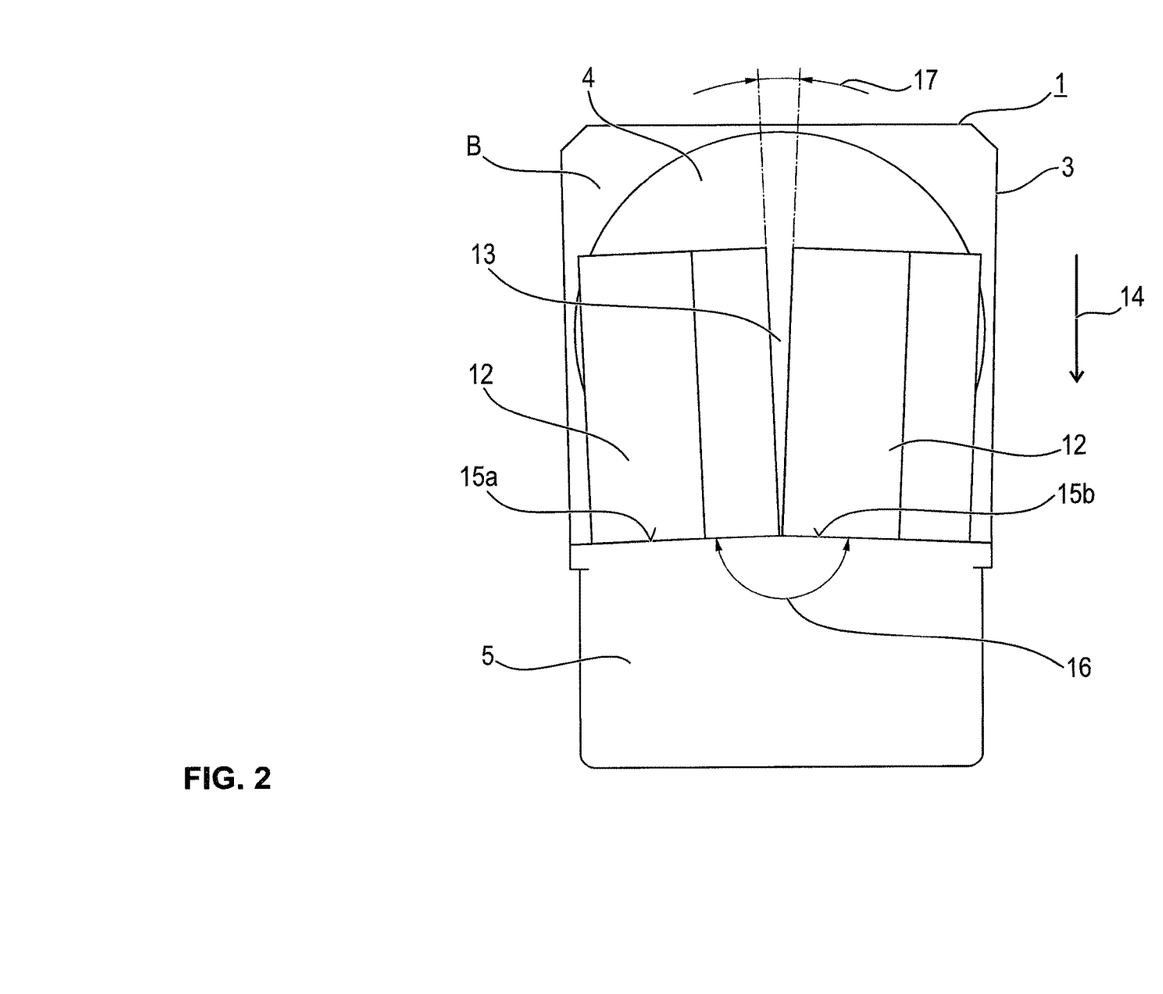
FIG. 2 is an elevation view of an end face of the drive.

FIG. 2 represents an end-face view of the drive 1, showing the (reverse-side) drive housing section 5 thereof, and the motor housing-side terminal section 5a thereof, with the plug-in connectors 12 of one or two hybrid bridges 2 or of one hybrid bridge 2 plugged-in, and a hybrid cable 2, including a plug-in connector 12, which is routed to the up-circuit control unit. It will be seen that the two plug-in connectors 12 are positioned obliquely, in relation to a (vertical) plug-in direction 14, to form a V-shaped interspace 13. This oblique positioning of the plug-in connectors 12 is effected by means of a gable roof-shaped overall contact surface 15 of the terminal section 5a, with two contact surfaces 15a and 15b for the respective plug-in connectors 12, such that surface normals of the contact surfaces 15a and 15b are mutually disinclined and thus (in relation to each other) also assume a V-shape. The contact surface angle 16 between the two contact surfaces 15a and 15b is, for example, 170°, such that the corresponding interspace angle 17 between the plugged-in plug-in connectors 12 is 10°.

This contact surface and interspace angle 16 and 17 respectively is particularly advantageously adapted to a desired, specified or selected radius of a positioning circle or circular arc segment, on or along which a plurality of drives 1 are arranged or positioned (in an azimuthally adjoining configuration). Depending upon this circle radius of the drive arrangement within a drive system, the contact surface angle 16, i.e. the angle of inclination of the contact surfaces in relation to the vertical and/or to the plug-in direction 14, can be selected or dimensioned to a larger or smaller value than 170°. Appropriately, the angles of inclination of the housing sections of the mating connector housing 10 which form the mating connectors 12 correspond to the contact surface angle 16, and thus—in relation to the representation of the drive 1 in FIG. 2—are also configured with a respective outward inclination declining by 5° in relation to the horizontal.

In the exemplary embodiment, the angle 17 of the V-shaped interspace 13 between the connected and/or fitted plug-in connectors 12 is thus 10°, wherein each of the plug-in connectors 12, in relation to the vertical plug-in direction 14, and specifically in relation to a parallel arrangement/orientation of the plug-in connectors 12 thereto, is inclined or obliquely arranged by 5° respectively (in the representation shown in FIG. 2, to the left or right).

Figure 4:
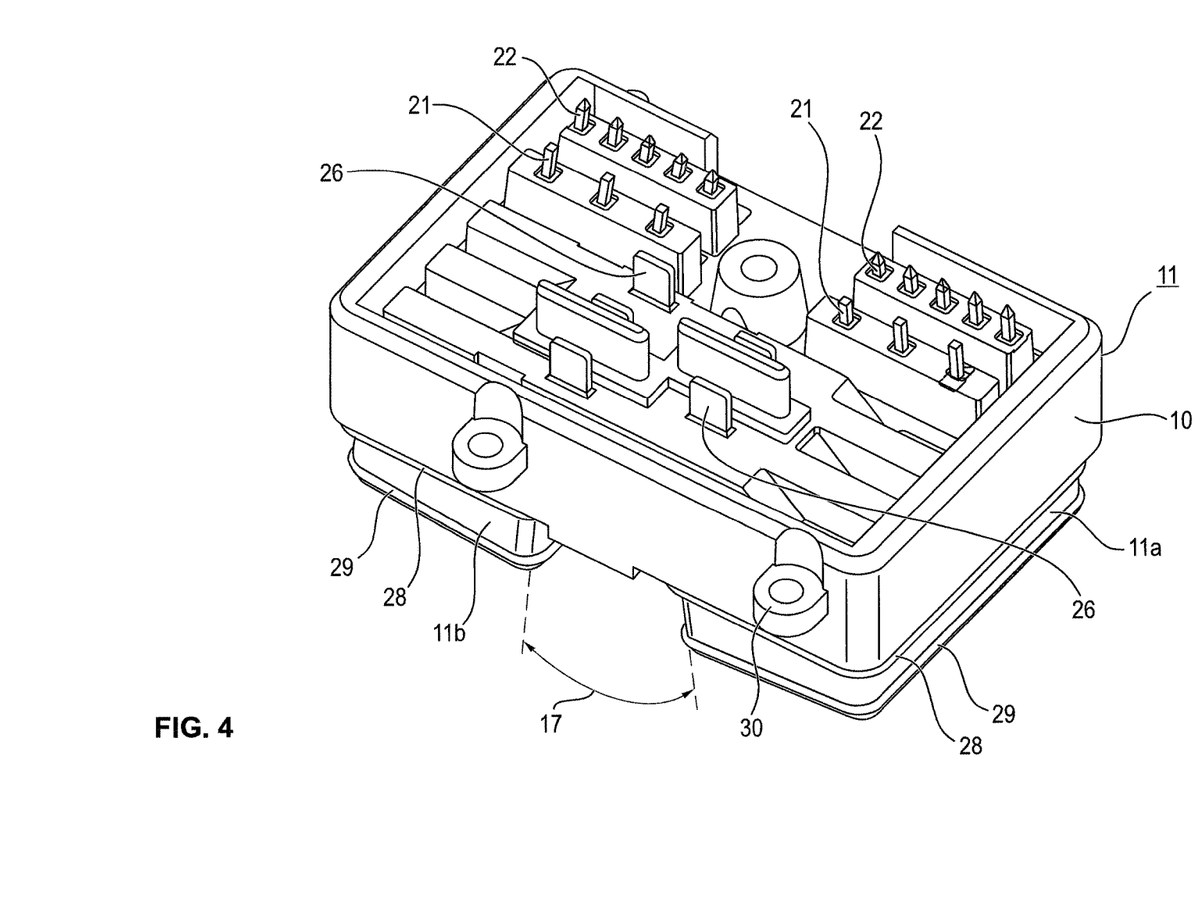
FIGS. 4 and 5 are perspective views showing a mating connector set according to the invention.
Figures 5, 5A:
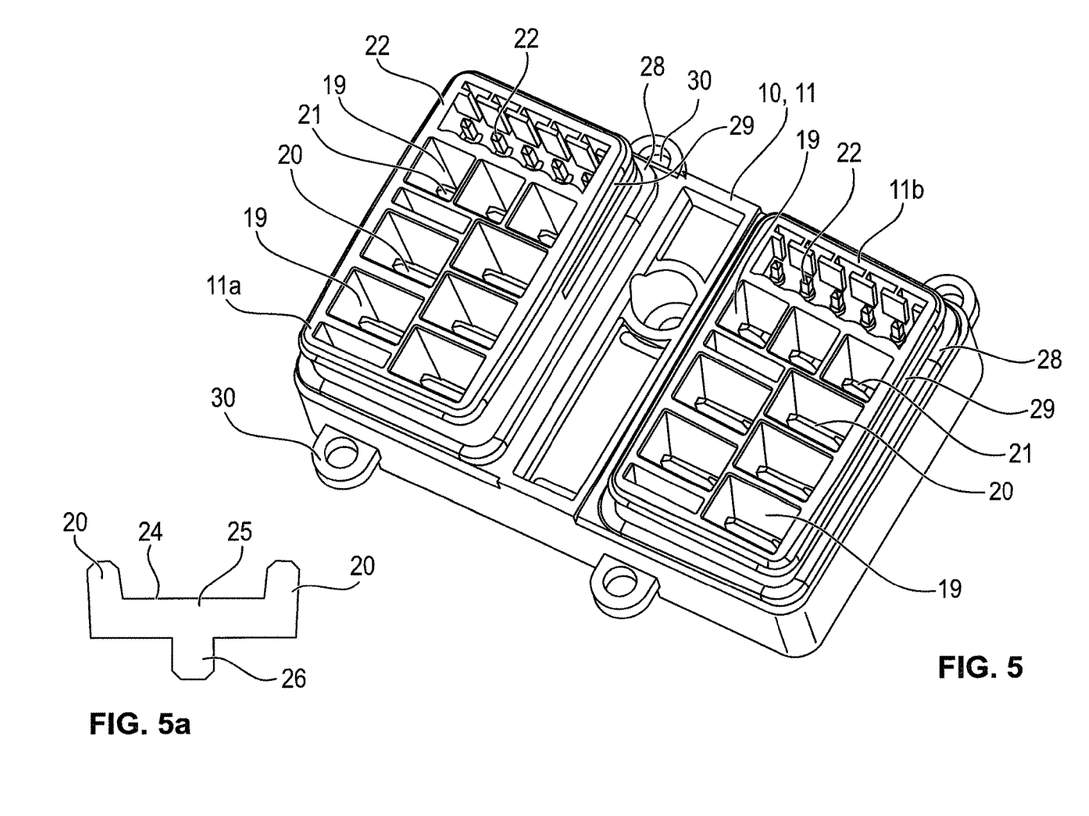
FIG. 5A is an end view of a conductor rail.

FIGS. 4 and 5 show the mating connector set 11, with the mating connector housing 10, from the reverse side of the housing (mounting side) facing the printed circuit board 8 or the printed circuit board section 8a, and from the terminal side facing the plug-in connectors 12 respectively, with the mating face indicated. As in connection with FIG. 3, in which the power section 18 of the motor or drive electronics is represented, or is at least indicated, the mating connector housing 10 has a plurality of housing chambers 19. The mating connector contacts of the mating connectors 11a, 11b are arranged in the latter. These are housing chambers 19 for current-carrying terminals 20, preferably in the form of tabs. Further terminals 21 in corresponding housing chambers 19 serve as reserve terminals. One or more further housing chambers 19 are provided for the accommodation of data transmission terminals 22.

The current-carrying terminals 20, also designated hereinafter as power terminals, are a constituent element of the exemplary conductor rails 24 represented in FIG. 5a. The conductor rail 24 has an (effective) conductor rail section 25 for the through-connection of the two mating connectors 11a and 11b. In principle, the conductor rail 24 is configured as a T-piece, the horizontal limb of which forms the conductor rail section 25 with the end-mounted power terminals 20. The latter are configured in a V-shape, preferably in accordance with the interspace angle 17. Between these two power terminals 20, on the opposite side of the conductor rail section 25, a printed circuit board terminal 26 is provided, which effectively forms the upright of the T-shaped conductor rail 24. The respective printed circuit board terminal 26 of the respective conductor rail 24 can be seen in FIG. 4, and projects beyond the underside or reverse side of the mating connector housing 10 represented therein.

The conductor rails (contact rails) 24 and, preferably or where applicable, the further terminals, i.e. the data transmission terminals 21 and the reserve terminals 22 also project beyond the mating connector housing 10 on the reverse side thereof. The conductor rails 24 are embedded in the mating connector housing 10, which is appropriately comprised of plastic, or are molded into a corresponding plastic material, such that the current-carrying terminals 20 are accommodated in the housing chambers 19, and thus project from the plastic material on the reverse side of the mating connector housing (connector housing) 10. The same applies where necessary to the further terminals 21, 22 of the mating connectors 11*a*, 11 *b*.

From FIGS. 3 to 5 it will also be seen that the mating connector housing 10, in the region of the mating connectors 10*a* and 10*b* thereof, is provided with axial and radial sealing elements in the form of axial seals 28 and radial seals 29 for the mating connectors 11*a* and 11*b*. To this end, the mating connector housing 10 is appropriately of two-part plastic construction (2-part plastic), with axial and radial seals 28, 29 formed of an appropriate flexible or elastic plastic material during the plastic injection-molding process.

From FIGS. 3 to 5, it will moreover be seen that the mating connector housing 10 has a plurality, and preferably two screw lugs or threaded lugs 30, which correspond to matching screw lugs 31 on the plug-in connector 12 for the accommodation of screws 32 for the screw attachment of the plug-in connector 12 to the mating connector housing 10, such that the lug openings thereof coincide for the accommodation of the respective screw 32.

Figure 1:
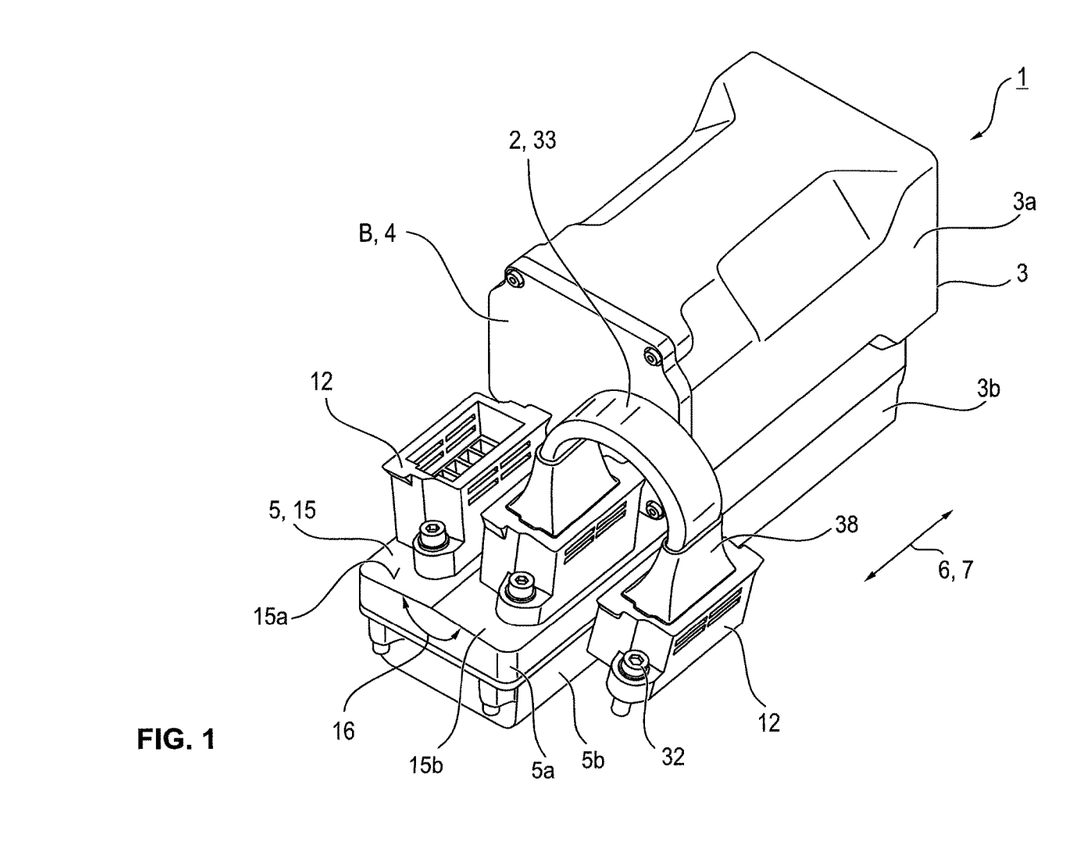
FIG. 1 is a perspective view of an individual drive according to the invention.
Figure 10:
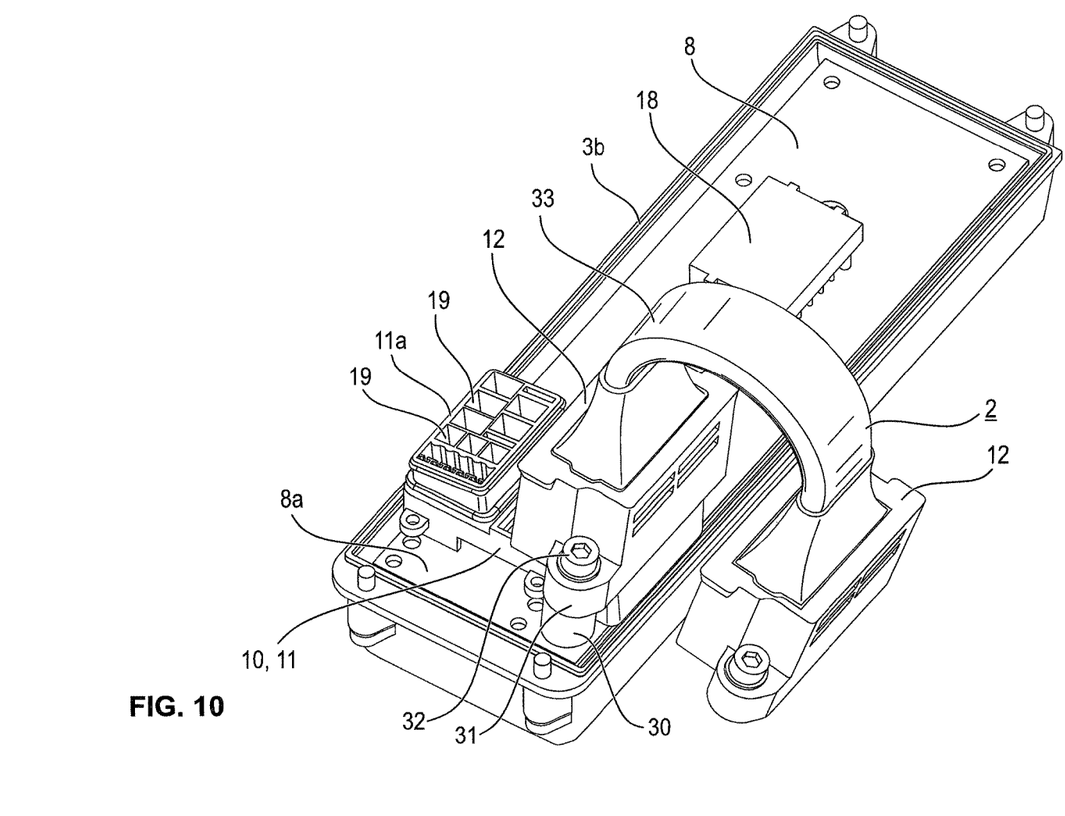
FIG. 10 is a perspective view of the bottom half of the drive housing, without the motor housing, similar to FIG. 3.

The screw attachment of the plug-in contact or plug-in connection between the plug-in connectors 12 and the mating connector set 11 or the mating connectors 11*a*, 11*b* thereof, is shown in FIG. 1 and is specifically represented in FIG. 10, which shows the drive system 1 without the motor housing 3*a* and without the electric motor, including its motor components, and which only represents the half-shell-type electronics housing 3*b* with the printed circuit board 8 inserted therein, including the mating connector set 11 or mating connector housing 10.

Figure 6:
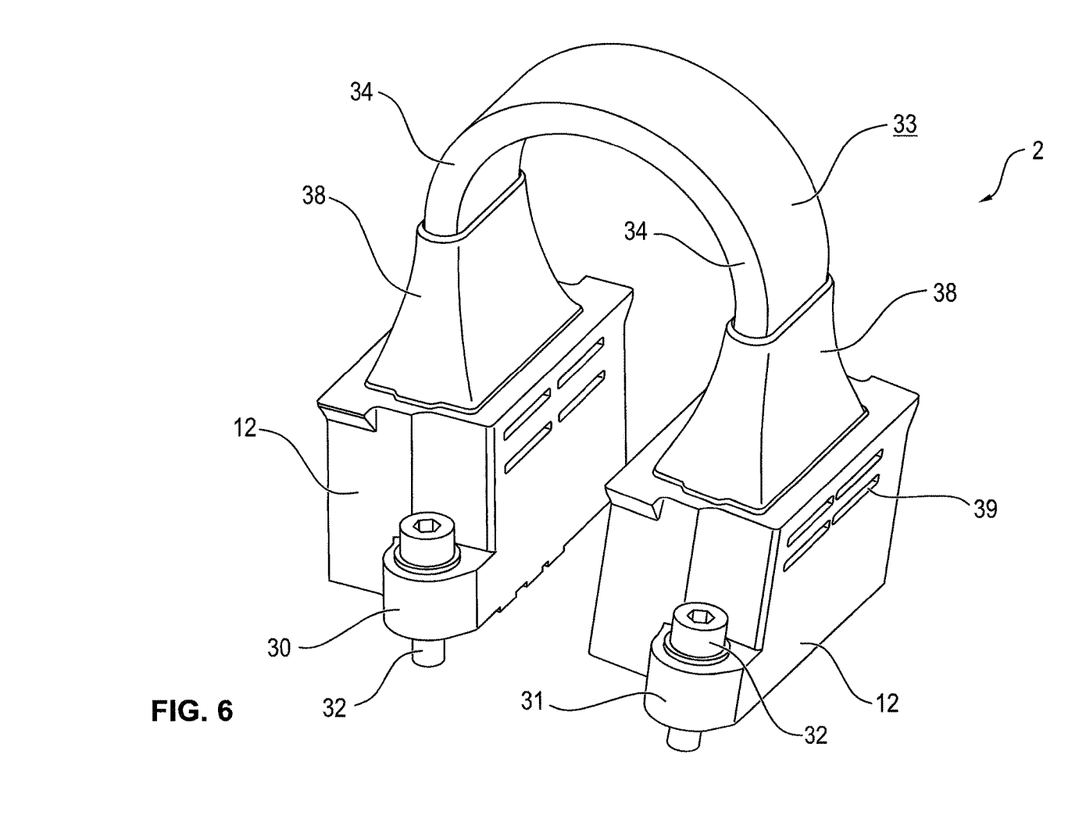
FIG. 6 is a top perspective view of a hybrid bridge.
Figure 7:
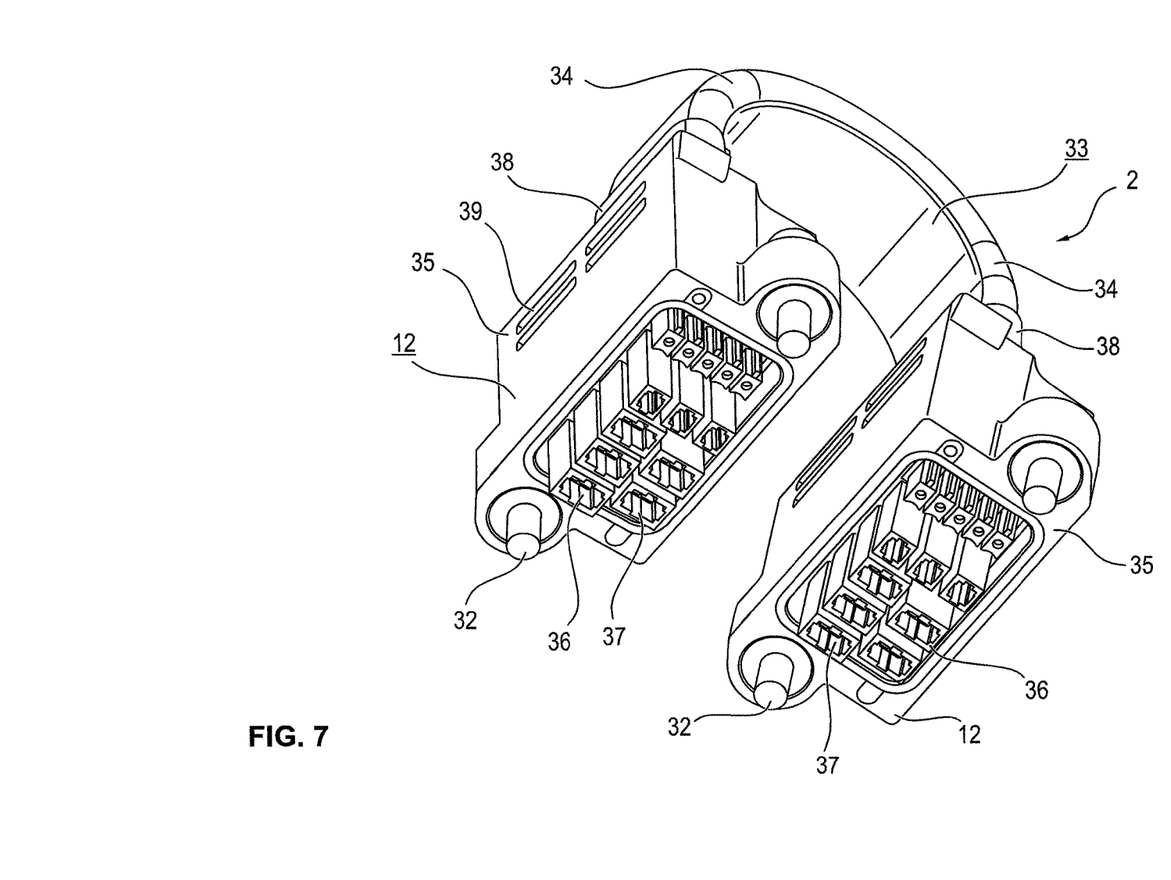
FIG. 7 is a bottom perspective view of the hybrid bridge.
Figure 11:
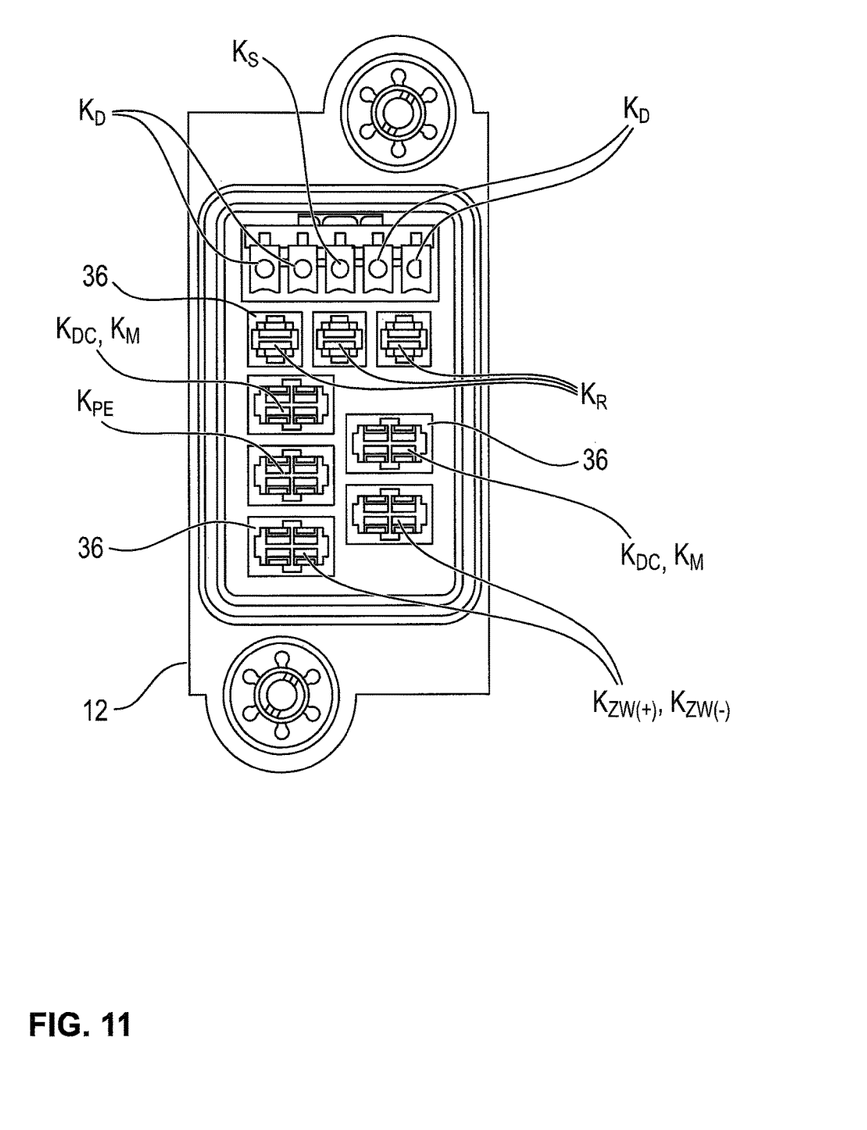
FIG. 11 is a plan view onto the mating face of the plug-in connector with a specific pin assignment.

FIGS. 6 and 7 show different perspective views of the hybrid bridge 2. The view shown in FIG. 7 represents the mating face of the respective plug-in connector 12. FIG. 11 shows an overhead view of the mating face of the plug-in connector 12, preferably with the following connector pin assignment. $K_{DC}$ represents the (positive) 24V DC voltage terminal for the energization of the motor winding of the electric motor, and $K_M$ represents the corresponding ground terminal. $K_{ZW(+)}$ and $K_{ZW(-)}$ represent the positive and negative intermediate circuit terminal respectively. $K_{PE}$ represents the PE (protective earth) conductor. In FIG. 11, within the contact or terminal block for data transmission, with the transmission contacts $K_D$, $K_S$ represents a shielding terminal (for screening). The reserve contacts are represented by $K_R$.

In the plug-in connection, the aforementioned "K" terminals are electrically bonded with the terminals 20, 21, 22 of the respective mating connectors 11*a*, 11*b*. By means of the hybrid bridge 2, an electrical connection is then formed to the mating connectors 11*a*, 11 *b* of an adjoining drive 1. Only the conductor rails 24 in this case form a through-connection (electrical connection) to the power terminals 20 of the other mating connector 11*b*, 11*a*, thus forming, via the latter and via the hybrid bridge 2, the electrical connection to the adjoining drive 1. The drives 1 thus connected are therefore arranged in parallel, in respect of power conduction.

Preferably, in an analogous manner, data and signals are also through-connected by means of the mating connector set 11 of the drive 1, and are routed via the hybrid bridge 2 of one drive 1 to the next drive 1 in sequence. To this end, here again, the corresponding terminals 21 and 22 for through-connection between the mating connectors 11*a*, 11*b* are preferably configured in turn in the form of T-section rails.

Figure 8:
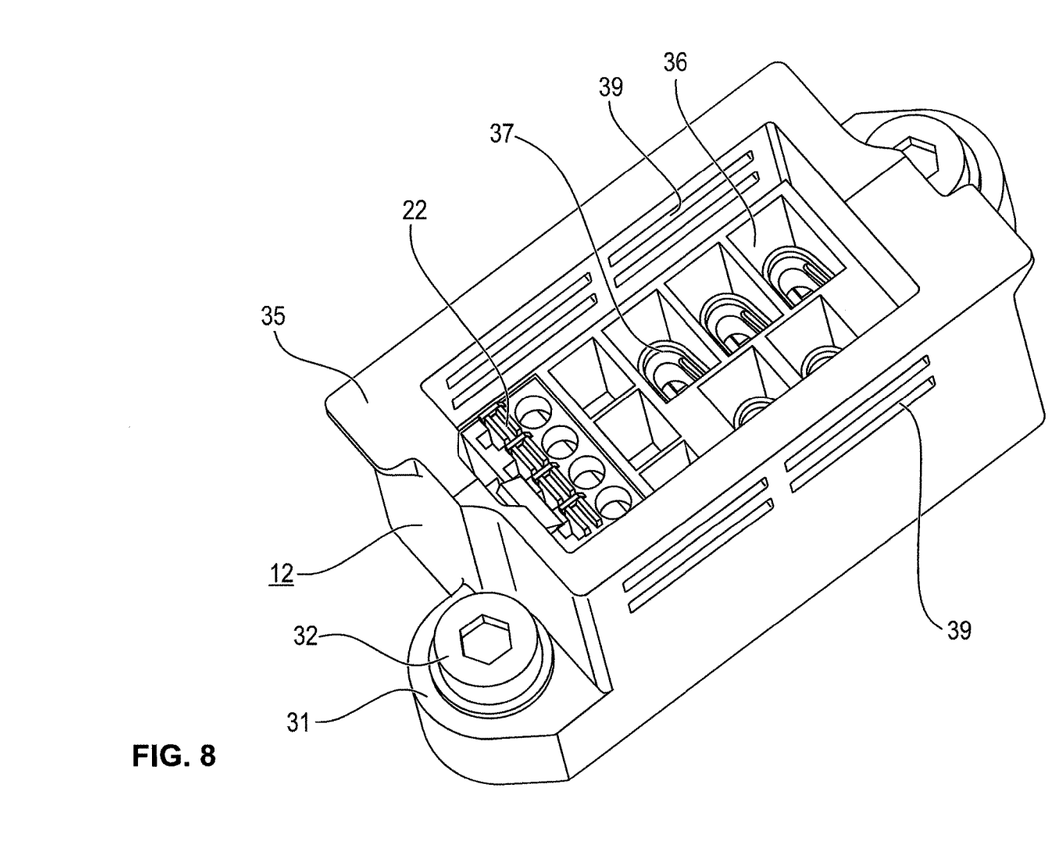
FIG. 8 is a perspective view of a plug-in connector, showing the cable-end terminal side thereof and having the connector pin assignment according to FIG. 7.
Figure 9:
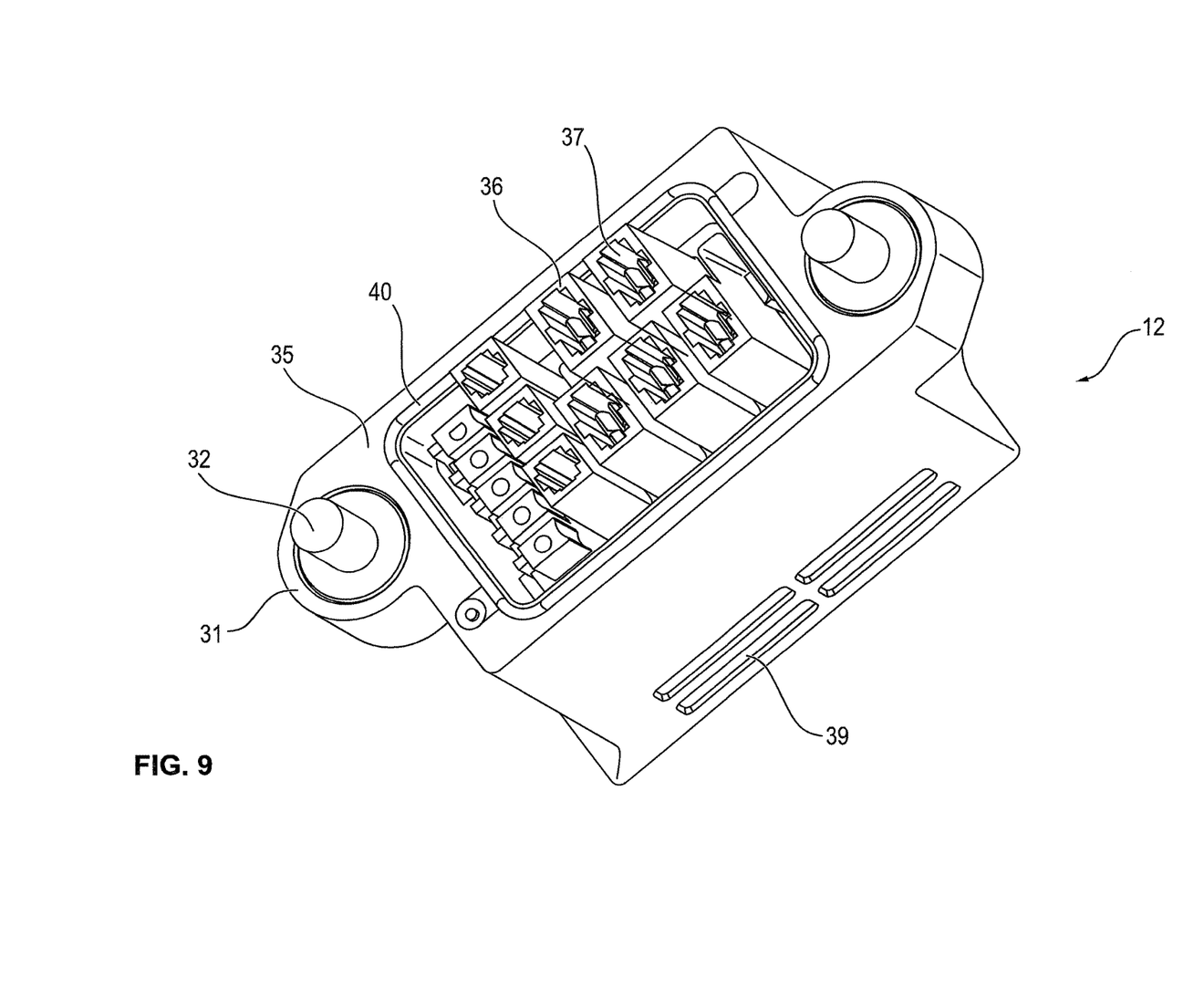
FIG. 9 is a perspective view of a corresponding plug-in connector.

FIGS. 8 and 9 respectively represent the plug-in connector 12, showing a view of the cable-end terminal side thereof (FIG. 8) and a view of the corresponding mating face with the mating connectors 11*a*, 11*b*, with the connector pin assignment according to FIG. 7.

In the exemplary embodiment, the hybrid bridge 2 (hybrid connector) comprises two plug-in connectors 12 and a hybrid cable 33, which is configured as a flat cable. The hybrid flat cable 33 has a cable sheath, which encloses a plurality of power and data transmission lines in a manner which is not represented in greater detail. The plug-in connectors 12 are mounted on the cable termination side, wherein, in the exemplary embodiment, one plug-in connector 12 respectively is arranged on the cable terminations on either side.

The hybrid flat cable 33 is routed between the two plug-in connectors 12 in the form of an arc. The hybrid flat cable 33 is appropriately pre-molded in this arc shape. This means that the hybrid bridge 2, in the form represented, is provided with the corresponding arc shape of the hybrid flat cable 33. The haunch 34 of the hybrid bridge 2, and the U-shaped or horseshoe-shaped arc of the hybrid flat cable 33 can be mutually parallel, or mutually inwardly inclined by the formation of the V-shaped interspace angle.

The hybrid bridge 2 is thus exceptionally space-saving, and permits an exceptionally compact and correspondingly space-saving arrangement of the drive 1 of the drive system, with correspondingly small or tight clearances between adjoining drives 1. The configuration of the hybrid cable 33 as a flat cable advantageously permits the bending thereof to an exceptionally small bending radius, specifically in comparison with a hybrid cable configured as a round cable.

The plug-in connector 12 has a preferably rectangular connector housing 35, which is appropriately configured as an injection-molded plastic component. Appropriately, the connector housing 35 comprises a plurality of contact chambers or housing chambers 36, which accommodate the plug-in contacts 37, i.e. the "K" terminals (FIG. 11) of the plug-in connector 12. These housing chambers 36 are preferably configured with a dome shape as domed chambers, the external dimensions of which are matched to the internal dimensions of the housing chambers 19 of the mating connectors 11*a*, 11*b*, such that these housing chambers 19 mate with the corresponding housing chambers 36 of the plug-in connector 12 by plug-in bonding (in the plug-in connection).

The plug-in contacts 37, at least for (the) current-carrying terminals are appropriately configured as two-limb spring contacts, as can be specifically seen in FIG. 9. As can be seen in FIG. 8, crimp connections with crimp lugs are configured in an opposing arrangement, i.e. on the connector reverse side or terminal side of the plug-in contacts 37. By means of these crimp lugs, the conductor ends of the conductor cores of the hybrid flat cable 33 are crimp-bonded (by interference fitting).

In the plug-in connection of the plug-in connector 12 with the corresponding mating connectors 11*a*, 11*b*, the power terminals 20 thereof, configured as tabs, slide in a contact-making arrangement between the contact tongues of the spring-action connection terminals (spring terminals) of the corresponding plug-in connector 12.

In the cable termination region, the hybrid flat cable 33 is provided with a molding, which executes a sealing and a strain-relief function, and is designated hereinafter as a packing ring 38. The latter, or molding material thereof, extends into the connector housing 35 of the respective plug-in connector 12. The connector housing 35 is provided with window-shaped or slit-shaped cut-outs 39, with which the molding material engages. Advantageously, the ring or molding 38 overlaps the connector housing 35 at least partially, and thus preferably covers the entire reverse side of the connector housing 35 represented in FIG. 8, and consequently the plug-in connector 12 on the cable side. The connector housing 35 of the plug-in connector 12 is also preferably configured as a two-part plastic component, with a sealing ring 40 serving as an axial seal.

The invention is not limited to the exemplary embodiments described above. Further variants of the invention can be inferred by a person skilled in the art, without departing from the object of the invention. Specifically, moreover, all the individual characteristics described with reference to the exemplary embodiments can be mutually combined in other ways, without departing from the object of the invention.

Accordingly, a drive system with a plurality of electromotive drives 1 and at least one hybrid bridge 2, and such a hybrid bridge 2, the hybrid cable 33 of which is configured as a flat cable, constitute independent inventions. Moreover, a drive 1, specifically in such a drive system, with a drive housing section 5 having a gable-roof-shaped contact surface 15 with corresponding (outwardly declining) inclined contact surfaces 15a and 15b for the plug-in hybrid connector, constitutes an independent invention. Advantageously, between two hybrid cable-side plug-in connectors 12, in the plug-in connection thereof to a drive side mating connector set 11, an acute angle 17 is thus formed. Appropriately, a motor housing-side terminal section 5a of the drive or motor housing 5, 5a incorporates the roof-shaped overall contact surface 15 with the two contact surfaces 15a, 15b, such that the surface normals thereof are mutually arranged in a V-shaped or wedge-shaped configuration.

Moreover, a drive 1 with a mating connector housing 10 mounted on the printed circuit board side, in which conductor rails 24 are integrated for the through-connection of power terminals 20 and/or data transmission terminals 22 between two mating connectors 11a, 11b, which are provided and arranged for plug-in connection with plug-in connectors 12 mounted on the hybrid cables side, constitute termination an independent invention.

The hybrid bridge 2 having an arc-shaped hybrid cable 33 with mutually V-shaped or wedge-shaped haunches 34, and with one or respectively one plug-in connector 12 arranged on the cable termination side, with terminal contacts 37 for power conduction and/or data transmission arranged in a connector housing 35, also constitutes an independent invention. In an advantageous embodiment, the connector housing 35 is specifically configured as a one-piece plastic housing with a plurality of housing chambers 36 for the accommodation of the or of each terminal or plug-in contact 37. Appropriately, the connector housing 35 is essentially rectangular, and is specifically configured with an essentially rectangular housing cross-section.

Additionally or alternatively, the hybrid cable 33, on the cable termination side, is provided with a molding 38, which executes a sealing and/or a strain-relief function, and which preferably extends into the connector housing 35 and/or at least partially encloses or overlaps the latter. A hybrid connector system with such a hybrid bridge 2 and with such a mating connector set 11, the mating connectors 11a, 11b of which are also preferably configured with housing chambers 19 for electric current-carrying and/or data transmission terminals 20, 21, 22, also constitutes an independent invention.

The following is a summary list of reference numerals and the corresponding structure used in the above description of the invention:

1 Drive
2 Hybrid bridge
3 Drive housing
3a Motor housing
3b Electronics housing
4 Motor end face/bearing cover
5 Terminal housing segment/region
5a Terminal section
5b Housing section
6 Drive system long side
7 Housing long side
8 Printed circuit board
8a Printed circuit board section
10 Mating connector housing
11 Mating connector set
11a Mating connector
11b Mating connector
12 Plug-in connector
13 Interspace
14 Plug-in direction
15 Overall contact surface
15a Contact surface
15b Contact surface
16 Contact surface angle
17 Interspace angle
18 Power section
19 Housing chamber
20 Current-carrying terminal/power terminal
21 Reserve terminal
22 Data transmission terminal
24 Conductor rail
25 Conductor rail section
26 Printed circuit board terminal
28 Axial seal
29 Radial seal
30 Screw lug
31 Screw lug
32 Screw
33 Hybrid/flat cable
34 Haunch
35 Connector housing
36 Housing chamber
37 Plug-in contact
38 Packing ring/molding
39 Cut-out
40 Sealing ring/axial seal
B Motor end face
K Terminal contact

The invention claimed is:

1. A drive system, comprising:
an electromotive drive having electronics;
a connection assembly formed of a hybrid bridge with a hybrid cable and a plug-in connector on a cable termination side, said connection assembly connecting said electromotive drive and electronics thereof to another electromotive drive for power conduction and for data transmission;
said drive having a drive housing with a housing segment that specifically projects beyond the electric motor on an end face or a reverse side thereof, said projecting housing segment having a roof-shaped contact surface for a plug-in connection of a hybrid cable-side plug-in connector with a mating connector in a drive-side mating connector set; and a terminal section of said motor housing that overlaps a housing section of the electronics housing, on the terminal and/or connector side, having a contact surface in a roof-shaped configuration for a formation of two contact surfaces or contact surface regions with mutually disinclined surface normals, with an obtuse angle therebetween such that an acute angle is formed between two hybrid cable-side plug-in connectors at the plug-in connection thereof to a mating connector set.

2. The drive system according to claim 1, wherein said electromotive drive is one of a plurality of drives each having electronics and said connection assembly is disposed to connect two of said drives to one another for power conduction and for data transmission therebetween.

3. The drive system according to claim 1, comprising a motor housing for accommodating an electric motor and/or motor components thereof, and a converter or electronics housing, for accommodating a printed circuit board for power and/or control electronics.

4. The drive system according to claim 3, wherein said converter and/or electronics housing of said drive or of each of said drives projects above said motor housing on an end face thereof and forms a housing section in which the printed circuit board with a printed circuit board section is accommodated.

5. The drive system according to claim 4, wherein said converter and/or electronics housing is a half-shell housing or half-shell-type housing and said converter and/or electronics housing projects above said motor housing on a reverse side end face thereof.

6. The drive system according to claim 3, wherein on an end face of said motor housing of the respective drive, a projecting printed circuit board section is mounted for accommodating said electronics of a mating connector housing of a mating connector set with printed circuit board-side contacting power terminals, or printed circuit board-side contacting data and/or signal terminals or printed circuit board-side contacting power and data or signal terminals.

7. The drive system according to claim 6, wherein said printed circuit board section projects from a narrow side or end face of said motor housing, and said power terminals are conductor rail terminals.

8. The drive system according to claim 6, which comprises at least one conductor rail for power conduction integrated in said mating connector housing of said mating connector set, said at least one conductor rail having an effective rail section for a through-connection of said two mating connectors in the mating said connector set.

9. The drive system according to claim 8, wherein said at least one conductor rail is one of a plurality of conductor rails, each integrated in said mating connector housing of each respective mating connector set, and/or each having an effective rail section for the through-connection of said two mating connectors in the mating said connector set.

10. The drive system according to claim 6, wherein said mating connector set and/or said mating connectors of said mating connector set is configured for plug-in connection with respective plug-in connectors mounted on said hybrid cable.

11. The drive system according to claim 6, which comprises a mating connector housing that is common to said mating connector set is disposed on a printed circuit board section for electronics.

12. The drive system according to claim 1, wherein said terminal section of said motor housing, on the terminal and/or connector side at said roof-shaped contact surface, is penetrated by said mating connector set and/or said mating connector set is accessible via said terminal section of said motor housing for plug-in connection with individual or paired pluggable plug-in connectors on said hybrid cable.

13. The drive system according to claim 1, wherein said at least one drive is one of a plurality of servo drives.

14. A hybrid connector system, comprising:
a hybrid cable being a flat cable having a cable termination side;
a plug-in connector at said cable termination end, said plug-in connector having plug-in contacts for power conduction and data transmission disposed in a connector housing
said hybrid cable having an arc shape with mutually V-shaped or wedge-shaped haunches, or being configured to be formed into said arc shape;
said connector housing being a one-piece plastic housing with a plurality of dome-shaped housing chambers for accommodating each terminal or plug-in contact for power conduction and/or data transmission;
said connector housing is substantially rectangular with a substantially rectangular housing cross section; and
said hybrid cable being formed with a molding on the cable termination side, for sealing and/or strain relief, said molding extending into said connector housing and at least partially enclosing and/or overreaching said housing; and
a mating connector having a contact surface which, in relation to a contact surface of the other said mating connector in a drive-side mating connector set, is inclined at an obtuse angle.

15. The hybrid connector system according to claim 14, configured for interconnecting a plurality of electromotive drives in a drive system for power conduction and data transmission between the plurality of electromotive drives.

* * * * *